United States Patent [19]
Richardson

[11] Patent Number: 5,647,139
[45] Date of Patent: Jul. 15, 1997

[54] UNIVERSAL VEHICLE GAUGES

[76] Inventor: John T. Richardson, 1230 NW. 45th Ct., Pompano, Fla. 33064

[21] Appl. No.: 454,704

[22] Filed: May 31, 1995

[51] Int. Cl.$^6$ .................................................. G01B 5/14
[52] U.S. Cl. ................................ 33/608; 33/533; 33/809
[58] Field of Search ............................. 33/533, 645, 608, 33/288, 809; 74/110

[56] References Cited

U.S. PATENT DOCUMENTS

| | | | |
|---|---|---|---|
| 287,580 | 10/1883 | Roach | 33/348 |
| 2,000,866 | 5/1935 | Smith | 33/288 |
| 2,344,241 | 3/1944 | Flint | 33/348 |
| 2,401,980 | 6/1946 | Smith | 33/288 |
| 2,581,021 | 1/1952 | Jacobsen et al. | 33/288 |
| 2,713,211 | 7/1955 | Fella | 33/288 |
| 2,818,598 | 6/1958 | Hershire | 33/809 |
| 3,057,074 | 10/1962 | Sidwell | 33/288 |
| 3,151,396 | 10/1964 | Junkins | 33/288 |
| 3,611,575 | 10/1971 | Chartier | 33/288 |
| 3,810,313 | 5/1974 | Hicks | 33/288 |
| 3,983,635 | 10/1976 | Jarman | 33/288 |
| 4,006,532 | 2/1977 | Hallman | 33/288 |
| 4,015,339 | 4/1977 | Hörvallius | 33/288 |
| 4,510,694 | 4/1985 | Boyce | 33/288 |
| 4,523,384 | 6/1985 | Giacomini | 33/608 |
| 4,718,845 | 1/1988 | Sheffield et al. | 74/110 |
| 4,939,848 | 7/1990 | Armstrong | 33/608 |
| 4,942,667 | 7/1990 | Fournier | 33/608 |
| 5,025,567 | 6/1991 | McWilliams et al. | 33/348 |
| 5,125,164 | 6/1992 | Fournier et al. | 33/608 |
| 5,131,257 | 7/1992 | Mingardi | 33/608 |
| 5,207,002 | 5/1993 | Humblet | 33/608 |
| 5,343,628 | 9/1994 | Ham | 33/608 |
| 5,390,421 | 2/1995 | Richardson | 33/288 |
| 5,507,101 | 4/1996 | Mason | 33/288 |

FOREIGN PATENT DOCUMENTS 670651  4/1952  United Kingdom ................. 33/809

*Primary Examiner*—G. Bradley Bennett
*Attorney, Agent, or Firm*—Price, Gess & Ubell

[57] ABSTRACT

Vehicle gauging apparatus employing a travelling gear box and a pair of gears contained therein to mount two gauge arms to move inwardly and outwardly along parallel paths with respect to one another. One embodiment employs an integral measuring tape and pivotable level gauge, as well as end-mounted measuring pins, while another provides pivotable suspension blocks adaptable to receive respective pinch well clamps or threaded stud pin holders. A male mounting ball and female mounting pin provide the ability to use the two embodiments together in particular measuring operations.

22 Claims, 6 Drawing Sheets

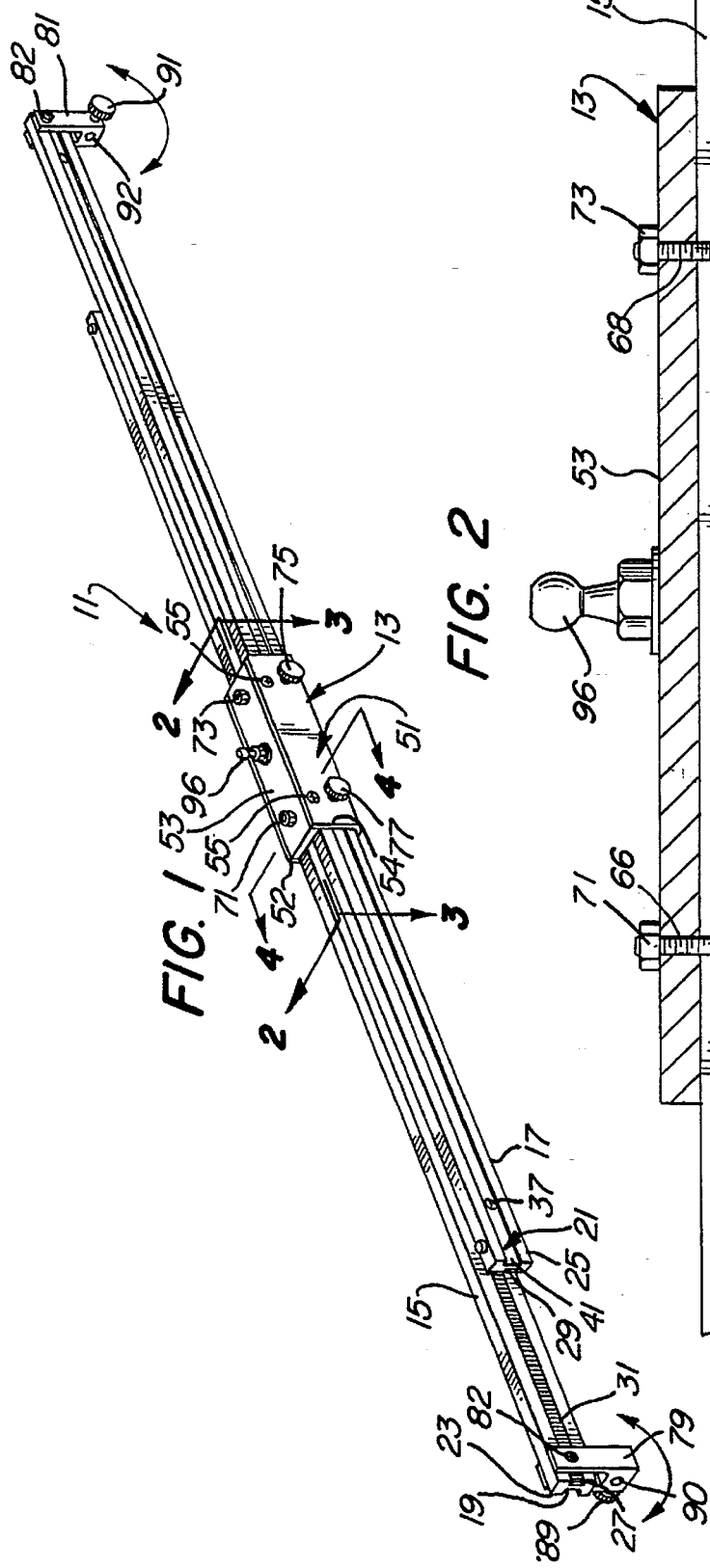
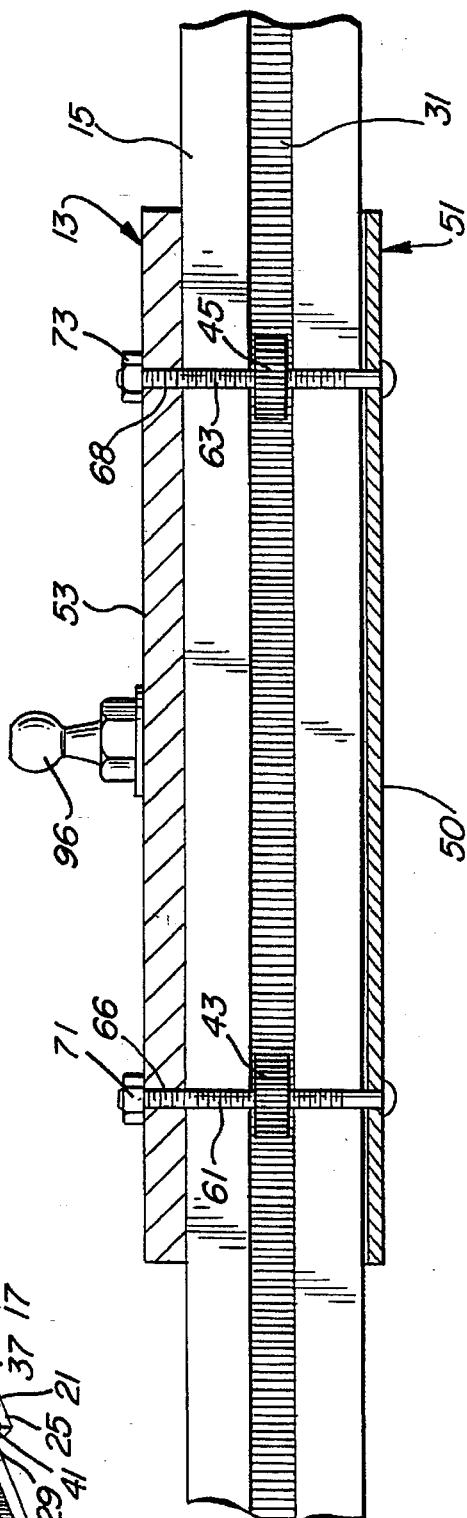

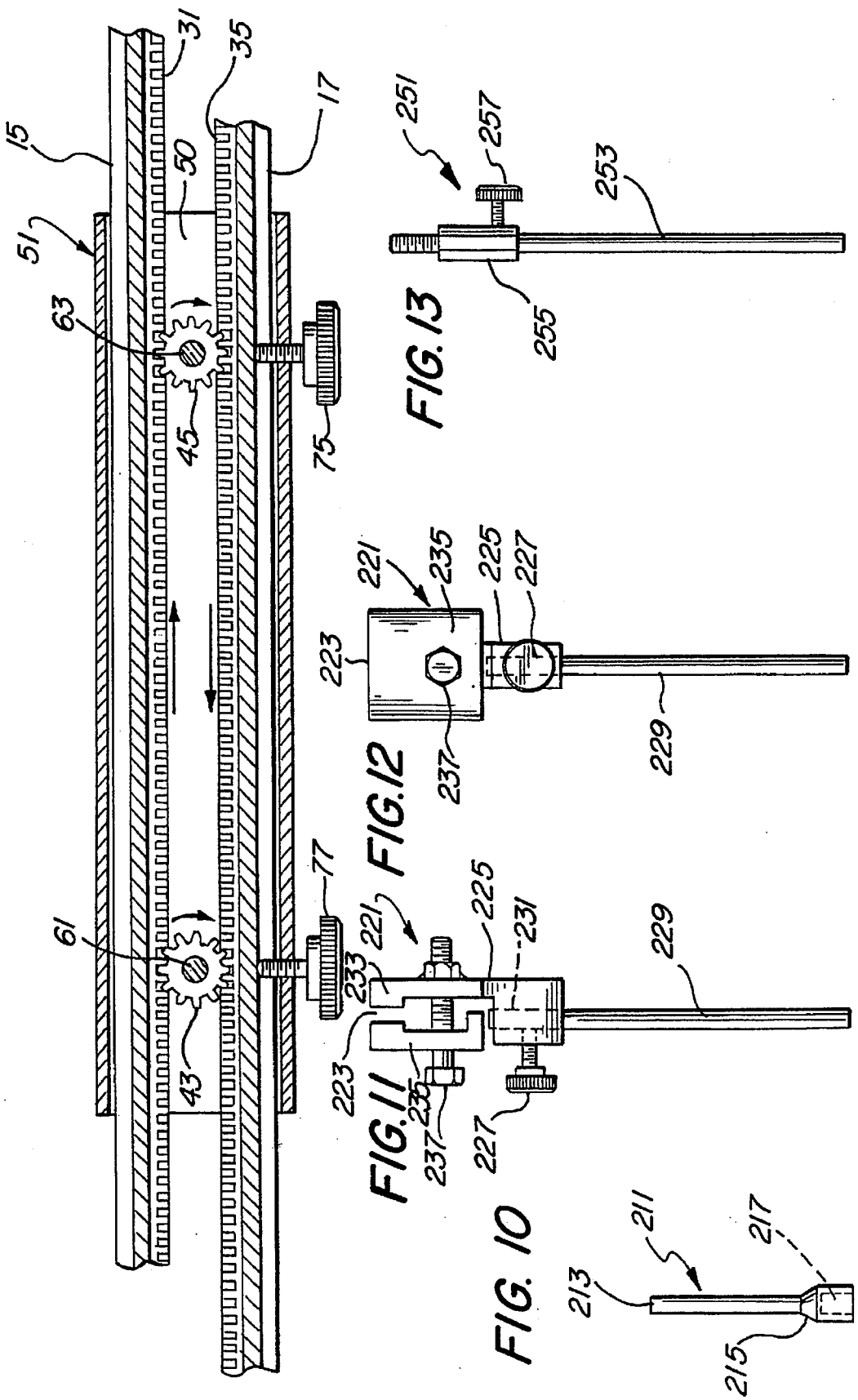

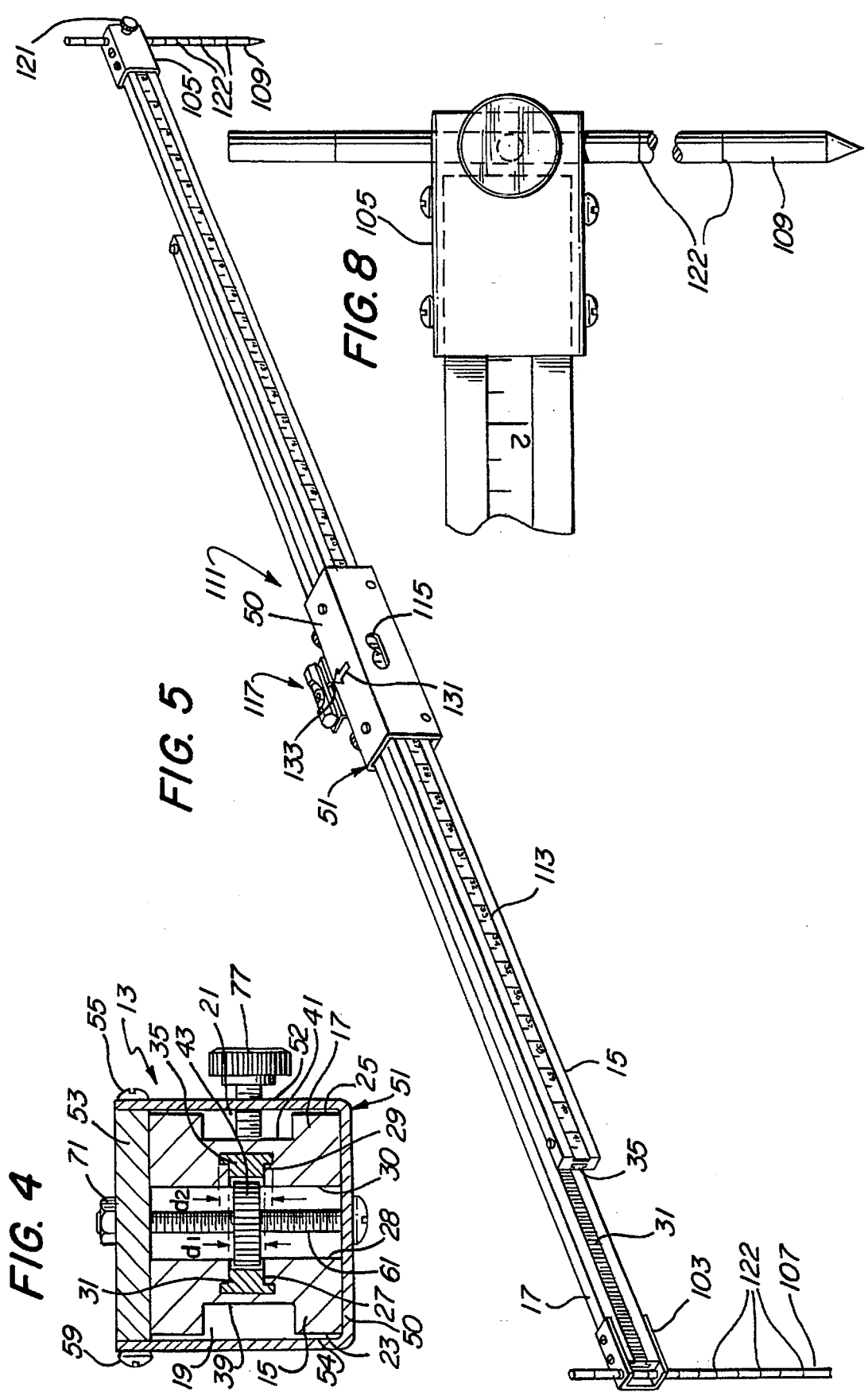

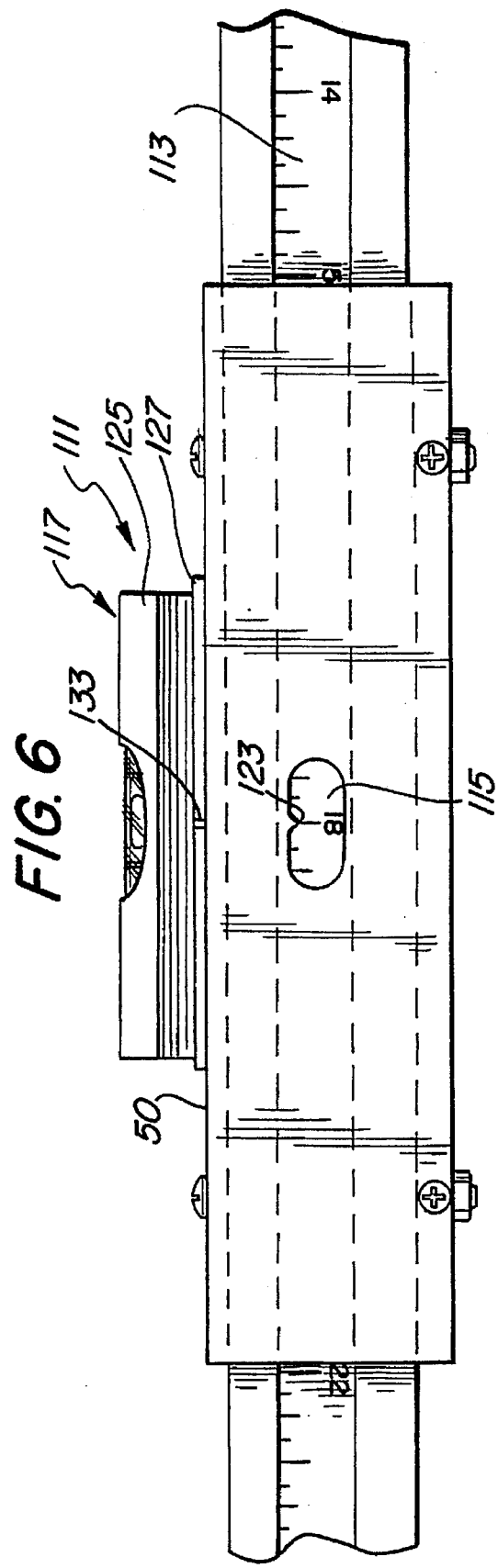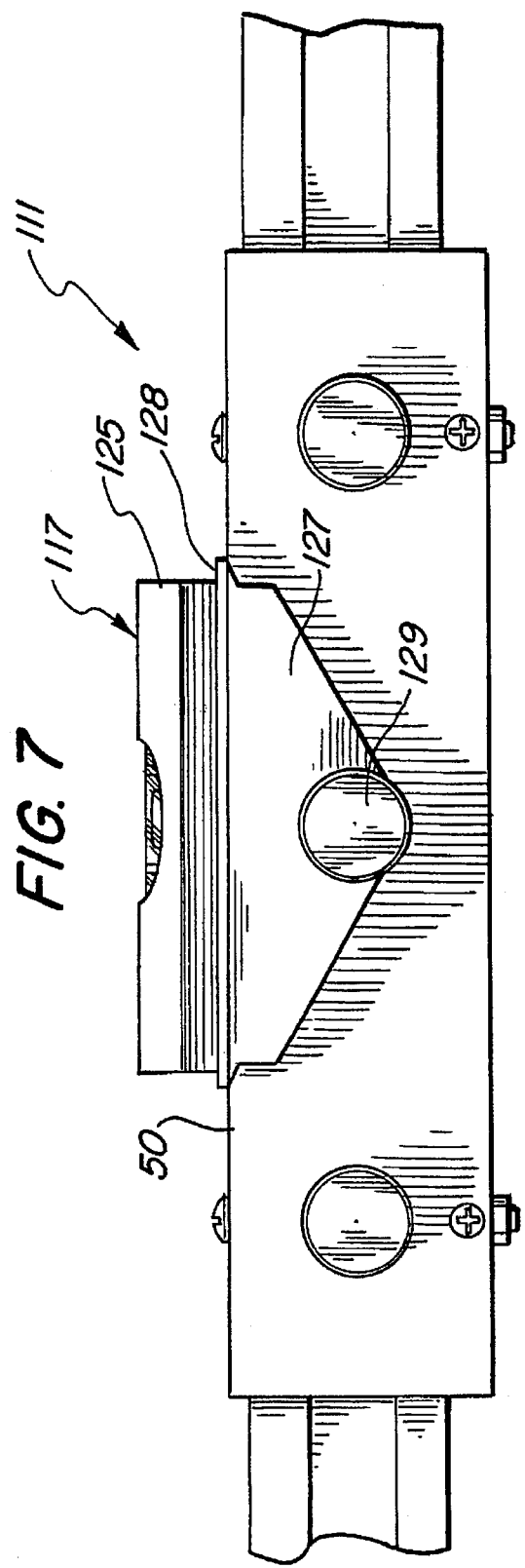

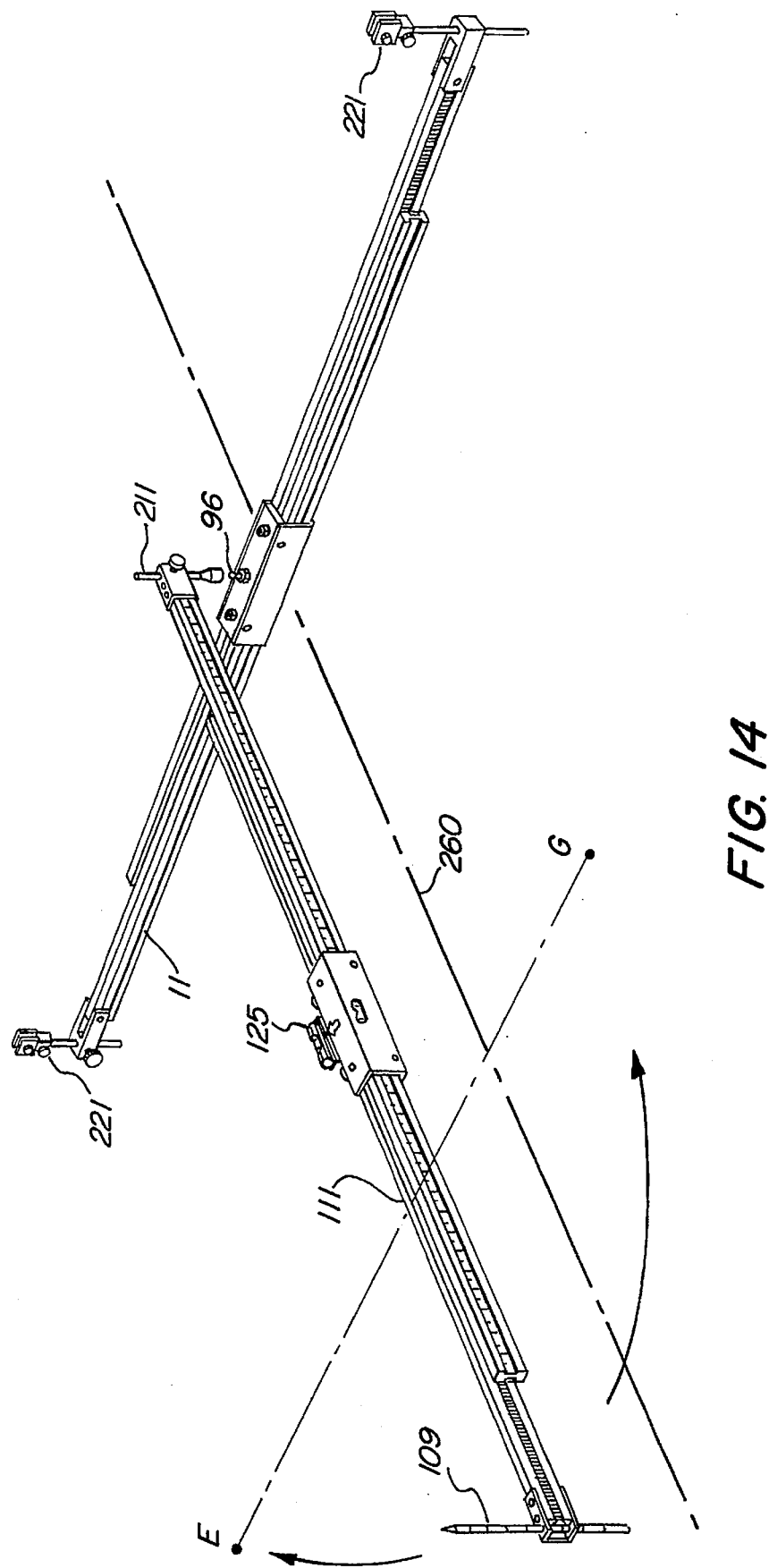

UNIVERSAL VEHICLE GAUGES

BACKGROUND OF THE INVENTION

1. Field of the Invention

The subject invention relates generally to gauging apparatus and, more particularly, to gauges for performing measurements to check or confirm the integrity of vehicle structures.

2. Description of Related Art

Vehicle gauges are known in the prior art which are adjustable in width in order to perform various measurements with respect to vehicle structure. Such gauges have typically employed relatively complicated cabling or cords cooperating with rollers to provide adjustability. In addition to being structurally complex, the adjusting action provided by such mechanisms is not as smooth or precise as would be desirable. Nor have such prior art gauges provided a suitable array of features facilitating multipurpose uses with increased accuracy.

OBJECTS AND SUMMARY OF THE INVENTION

It is therefore an object of the invention to provide improved gauging apparatus;

It is another object of the invention to provide improved vehicle gauging apparatus;

It is another object of the invention to provide improved adjustable width vehicle gauging apparatus for either comparative or single distance measurement;

It is another object of the invention to provide smoother-acting adjustable-width vehicle gauging apparatus; and It is another object to improve accuracy of adjustable-width vehicle gauging apparatus.

According to the invention, vehicle gauging apparatus is provided which includes first and second elongated measuring arms and means for mounting the first and second arms to move along parallel linear paths toward and away from one another. The mounting means includes first and second gear tracks located in the first and second arms, gear means riding between the first and second gear tracks, and means for slidably mounting the arms with respect to one another, while maintaining the gear means meshed between the first and second gear tracks. This approach provides smooth, stable motion and avoids cable stretch, which can impair accuracy of measurements.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 1 is a perspective view of a frame gauge according to a first preferred embodiment of the invention;

FIG. 2 is a sectional view taken at 2—2 of FIG. 1;

FIG. 3 is a sectional view taken at 3—3 of FIG. 2;

FIG. 4 is an end view of the frame gauge of FIG. 1;

FIG. 5 is a perspective view of a second preferred embodiment of the invention;

FIG. 6 is a partial front view of the embodiment of FIG. 5;

FIG. 7 is a partial rear view of the embodiment of FIG. 5;

FIG. 8 is a partial front view of one end of the embodiment of FIG. 5;

FIG. 10 is an elevational view of a female mounting pin;

FIG. 11 is a side elevational view of a pinch well clamp pin holder;

FIG. 12 is a front elevational view of the pinch well clamp pin holder of FIG. 11;

FIG. 13 is a side elevational view of a threaded stud pin holder; and

FIG. 14 is a perspective view illustrating a gauging apparatus and method utilizing the gauge embodiments of both FIG. 1 and FIG. 5.

DETAILED DESCRIPTION OF THE PREFERRED EMBODIMENTS

Figure 9:
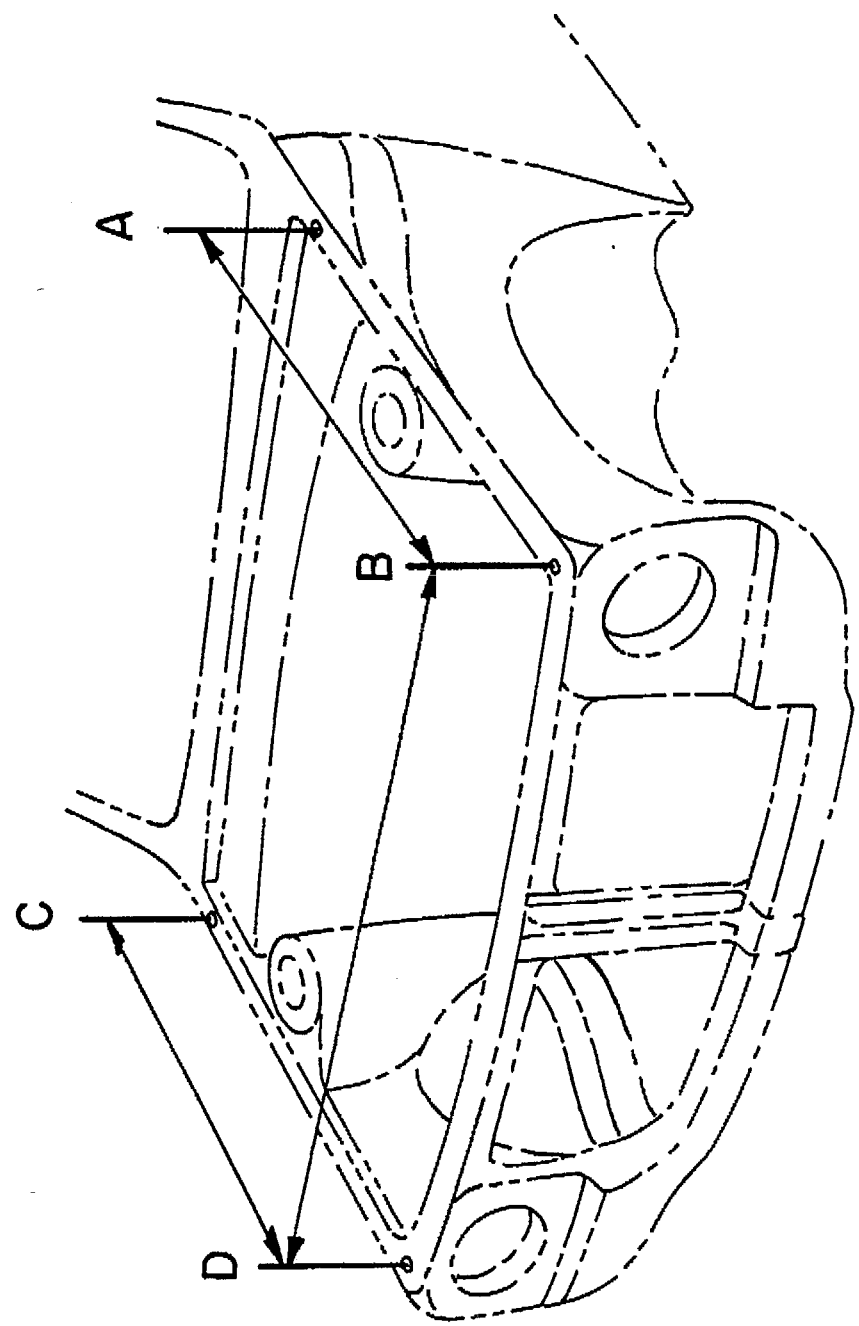
FIG. 9 is a perspective view of an automobile hood area useful in illustrating operation of the preferred embodiments.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide vehicle gauging apparatus readily adaptable for manufacture and with particularly useful combinations of features.

A preferred gauging apparatus comprising a lower frame comparative measuring bar or gauge 11 is illustrated in FIGS. 1-4. The comparative measuring bar 11 includes a travelling gear box 13 and first and second equal-length gauge arms 15, 17, which are elongated and generally rectangular in shape. As best seen in FIG. 4, the gauge arms 15, 17 have first central slots 19, 21 formed on the respective outside surfaces 23, 25 thereof and second, preferably "T-shaped" central slots 27, 29 formed on the interior surfaces 28, 30 thereof. The gauge arms 15, 17 are preferably fabricated of metal such as aluminum or steel with milled slots 19, 21, 27, 29.

The T-shaped slots 27, 29 are mirror images of one another and serve to mount oppositely-disposed gear tracks 31, 35, which thus extend lengthwise down the inside center of each gauge arm 15, 17. The gear tracks 31, 35 are T-shaped in cross-section and dimensioned such that they may be slid into the T-shaped slots 27, 29 and then fastened therein, for example, by a screw 37 inserted into each of the tracks 31, 35 from the floors 39, 41 of the respective first central slots 19, 21. Cross-sectional dimensions $d_1$ and $d_2$ of the gear tracks 31, 35 as shown in FIG. 4 may be, for example, ³⁄₁₆-inch and ⁵⁄₁₆-inch.

First and second gears 43, 45 are disposed to run between the tracks 31, 35 and are held in place between the tracks 31, 35 by the dimensioning of the gear box 13, which is generally rectangular in cross-section. The gear box 13 includes a U-shaped channel 51, which forms three sides of the gear box 13, and a rectangular cover plate 53, which forms the fourth side of the gear box 13. First and second pairs of screws 55, 59 fasten the plate 53 in place between the walls 52, 54 of the U-shaped channel 51. In other embodiments, the gear box 13 could be a single piece or unitary member, formed, for example, by an extrusion process.

The gears 43, 45 are mounted for rotation on respective shafts 61, 63 which are rigidly mounted to the bottom 50 of the U-shaped channel 51 and to the cover plate 53. The shafts 61, 63 in the illustrated embodiment are threaded, and the gears 43, 45 are tapped to thread onto the shafts 61, 63 such that their teeth are aligned to mate with the teeth of the tracks 31, 35. Bushings, for example, such as nylon bushings, may be provided on each side of each of the gears 43, 45 to further stabilize their position and the motion of travelling gear box 13 down the tracks 31, 35. A single gear could be employed in various other embodiments instead of the two gears 43, 45 employed in the illustrative embodiment. Such a single gear could be centrally disposed to ride between first and second spacer shafts mounted in the gear box 13. Presently, the two-gear embodiment is preferred because of better riding properties.

To assemble the comparative measuring bar 11, the gears 43, 45 are positioned in the respective tracks 31, 35, which are manually or otherwise grasped so as to maintain the gears 43, 45 sandwiched in position. The sandwiched gear structure is then inserted into the U-shaped channel 51, and the respective shafts 61, 63 inserted into bores or holes in the channel 51 and threaded through the gears 43, 45. The cover plate 53 is then inserted between the side walls 52, 54 of the channel 51 such that respective bores 66, 68 therein pass over the shafts 61, 63. The screw pairs 55, 59 are then screwed into place and appropriate locking nuts 71, 73 threaded onto the ends of the shafts 61, 63. Alternatively, the screw pairs 55, 59 could be self-tapping with no nuts.

First and second thumb screws 75, 77 are threaded through one side of the wall 54 of the channel 51 and may be screwed into the first central slot 21 in order to fix the travelling gear box 13 in position, and thus fix the length of gauge 11.

First and second suspension blocks 79, 81 are pivotally mounted by suitable fasteners 82 at opposite ends of the gauge 11. One suspension block 79 is mounted at one end of the first gauge arm 15, while the second suspension block 81 is mounted at one end of the second gauge arm 17. Thumb screws 89, 91 and respective cylindrical bores 90, 92 are provided in each of the suspension blocks 79, 81 in order to facilitate insertion and attachment of various accessories such as the pinch well clamp pin holder 221 and the threaded pin holder 251 shown in FIGS. 11 and 13, respectively. A male mounting ball 96 is also mounted on the top of the channel cover plate 53 and cooperates with the female positioning pin 211 shown in FIG. 10, as hereafter described in further detail.

In operation, by virtue of the gears 43, 45 and gear tracks 31, 35 the gauge arms 15, 17 may be moved laterally apart from one another along parallel lines to a maximum gauge length which is roughly double the length of one gauge arm, e.g., 15, and may be moved together to assume a minimum length equal to that of one gauge arm, e.g., 15, alone. In this minimum length position, the gear box 13 lies centrally positioned between the ends of the gauge arms 15, 17, in the embodiment illustrated. Any selected length between the maximum and minimum gauge lengths may be achieved by moving the gauge arms 15, 17 with respect to one another to the desired length and then fixing them in position by tightening down the thumb screws 75, 77. The gauge arms 15, 17 could be of different and/or unequal lengths as desired.

FIGS. 5–8 illustrate a preferred tram gauge embodiment 111 according to the invention. The tram gauge 111 is constructed in part of structure identical to that of FIGS. 1–4 as indicated by the like numerals employed in FIGS. 5–8. In particular, the embodiment of FIGS. 5–8 particularly employs the dual gear, traveling gear box structure of FIGS. 2 and 3.

The tram gauge embodiment 111 differs from that of FIGS. 1–4 in employing respective mounting brackets 103, 105 at the opposite ends thereof for mounting respective measuring pins 107, 109 and by inclusion of a measuring tape 113, an associated measuring window 115, and a pivotable level gauge 117.

The mounting brackets 103, 105 each threadably mount respective thumb screws, e.g. 121, which may be tightened down to hold the pointed measuring pins 107, 109 in selected position. The pins 107, 109 contain equally-spaced gradations 122 along their outside edge, spaced apart from one another, for example, by one inch.

The measuring tape 113, for example, in the metric scale, is fixed, for example, by a suitable adhesive, in the slot 21 of the first gauge arm 15. The measuring window 115 is cut in one side of the U-shaped channel 51 and contains a pointer 123 (FIG. 6) positioned to provide an accurate reading, which constitutes one-half of the distance between the two points of the respective measuring pins 107, 109. The tape 113 may be positioned by determining the exact center of the gauge arm 15 and locating the center of the tape 113 at that point. In the embodiment illustrated, the numbers on the tape 113 read "upside down" in FIG. 6. Embodiments can also be constructed such that the numbers read "right side up."

As particularly seen in FIGS. 6 and 7, the pivotable level gauge 117 includes a conventional level bubble 125 affixed to a bracket 127. The bracket 127 is pivotally mounted to one side of the U-shaped channel 51 by a suitable thumb screw 129, which may include a star or wave washer located behind or in conjunction with it. The angle of the bracket 127 with respect to the plane defined by the top surface of the rectangular floor 50 of the channel 51 may thus be varied, and the thumb screw 129 tightened down, to maintain the bracket 127 and, hence, the level bubble 125 at the selected angle. An arrow 131 (FIG. 5) is placed, for example, by painting or applying a suitable decal on the top surface of the channel floor 50 and cooperates with a line 133 marked on the horizontal surface of the level mounting bracket 127. The arrow 131 and line 133 are so positioned such that they align when the level bubble 125 and the horizontal mounting surface 128 of the bracket 127 lie horizontal; i.e., the mounting surface 128 lies in a plane parallel to or coincident with that of the top surface of the floor 50 of the U-shaped channel 51.

FIG. 9 illustrates measurements in the hood area of a vehicle which may be made using the tram gauge 111 of FIGS. 5–8 where dimensioning A to B, C to D, and B to D are measured exactly and compared to factory specifications. Assuming that diagonal dimensions A to D and C to D are specified to be equal if the vehicle is undamaged, the tram gauge 111 of FIGS. 5–8 may be used to confirm that the distances are, in fact, equal by setting it to the length of one diagonal and then applying the gauge to the other diagonal to see if it is the same length. The pins 109 are adjusted to suitable height to pass over vehicle componentry and the level gauge 117 is used to ensure that the gauge 111 is level during the measurements. If comparative measurements are made at an angle to the horizontal, the level gauge 117 may be pivoted until the level bubble is centered during the first measurement and then fixed in position. This position is then used in the second comparative measurement.

FIG. 10 illustrates a female mounting pin 211 having a cylindrical shaft or rod 213 and a hollow mounting cap 215 at one end of the shaft 211. The pin 211 is preferably a unitary metal member, with the interior 217 of the hollow cap 215 being shaped to mount over the male receiving ball 96 in snug, male-female fashion.

FIGS. 11 and 12 illustrate a pinch well clamp pin holder 221 having a clamp 223 rigidly attached to an angle member 225 which is, in turn, attached by a thumb screw 227 to a pin 229. The pin 229 is slidably mounted with respect to the angle member 225 via a bore 231 therein. The jaws 233, 235 of the clamp 223 can be moved toward one another (tightened) or away from one another (loosened) by activation of a threaded adjustment bolt 237. In operation, two pinch well clamps 221 are attached to the gauge 11 of FIG. 1 by inserting these respective pins 229 into the respective bores 90, 92 and tightening the thumb screws 89, 91. The clamps 223 are clamped onto respective pinch wells, which typically extend down opposite sides of the underside of a vehicle to thereby suspend the gauge 11 beneath the vehicle to perform various gauging operations.

One such operation is illustrated in FIG. 14 wherein the lower frame comparative measuring bar 11 is suspended via first and second pinch well clamps 221 beneath a vehicle (not shown) with the male mounting ball 96 positioned on the center line 260 of the vehicle by suitable adjustment of the gauge arms 15, 17 of the gauge 11. The tram gauge 111 of FIGS. 5–8 is then fitted with the female mounting pin 211, which is adjusted such that the gauge 111 is level by use of the bubble level 125. The gauge 111 may then be swung to various points on the vehicle frame for comparative measuring purposes; e.g. to ascertain, for example, that the distance to point "E" is the same as that to point "G."

FIG. 13 illustrates a threaded stud pin holder 251 having a threaded stud 253 slidably mounted with respect to a sleeve 255. The sleeve 255 has a thumb screw 257 threadably mounted therein for fixing the stud 253 in a selected position. Threaded pin holders 251 screw into various preexisting holes in a vehicle structure such as a threaded bottom fender mounting hole or a threaded suspension bolt hole, and thereby enable suspending the gauge 11 at such points.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A gauging apparatus for performing measurements with respect to a vehicle comprising:

first and second elongated measuring arms;

means for mounting said first and second arms to move synchronously along parallel linear paths toward and away from one another, said means including respective first and second gear tracks in said first and second arms, gear means for riding between said first and second gear tracks, and means for slidably mounting said arms with respect to one another while maintaining said gear means meshed between said first and second gear tracks; and single measurement means for simultaneously measuring a first distance along the first elongated measuring arm from a distal end of the first elongated measuring arm to a point in the mounting means and a second distance along the second elongated measuring arm from a distal end of the second elongated measuring arm to the same point in the mounting means, thereby producing a measurement of distance between the two distal ends.

2. The gauging apparatus of claim 1 wherein said arms are further mounted to lie one over the other and to move one over the other along said parallel paths, and wherein said mounting means comprises:

shaft means for mounting said gear means; and housing means for mounting said shaft means and slidably receiving said first and second arms.

3. The gauging apparatus of claim 2 wherein said housing means comprises:

a U-shaped channel;

a cover plate means for closing said channel; and fastening means for fastening said cover plate means together with said U-shaped channel.

4. The gauging apparatus of claim 1 wherein said gear means comprises first and second gears.

5. The gauging apparatus of claim 3 wherein one of said elongated arms has a slot in the outer surface thereof and wherein said housing means further includes thumb screw means adjustable to thread into said slot so as to fix said arms in a selected position with respect to one another.

6. The gauging apparatus of claim 2 wherein said gear means comprises first and second gears and said shaft means comprises respective first and second shafts, said first and second shafts being fixedly mounted to said housing means.

7. The gauging apparatus of claim 2 wherein said single measurement means comprises a measuring device mounted on said first arm and a window means, on said housing means, cooperating with said measuring device to enable reading the measurement therefrom.

8. The gauging apparatus of claim 2 further including a level pivotally mounted to said housing means.

9. The gauging apparatus of claim 8 further including alignment means for establishing a horizontal position of said level with respect to said housing means.

10. The gauging apparatus of claim 9 wherein said alignment means comprises an arrow on a planar surface of said housing means and a mark on said level for aligning therewith.

11. The gauging apparatus of claim 6 further including first and second suspension blocks pivotally mounted at opposite ends of said apparatus, one on said first arm, and one on said second arm.

12. The gauging apparatus of claim 11 wherein each of said suspension blocks comprises a block portion attached to first and second suspension arms, each said block portion having a respective bore therethrough.

13. The gauging apparatus of claim 10 further comprising first and second measuring pins and means for mounting said measuring pins to depend perpendicularly from a respective arm.

14. The gauging apparatus of claim 13 wherein said measuring pins have a plurality of equally-spaced gradations thereon, and further including means for adjusting the distance said first and second measuring pins depend beneath said arms.

15. The gauging apparatus of claim 12 further including pinch well clamp means insertable into one of said respective bores for attachment to the pinch well of a vehicle structure.

16. The gauging apparatus of claim 15 further including threaded stud pin holder means insertable into one of said respective bores for attachment to a preexisting threaded hole of a vehicle structure.

17. The gauging apparatus of claim 16 further including a male mounting ball mounted on said housing means.

18. The gauging apparatus of claim 17 further including a female mounting pin having means for mounting on said male mounting ball.

19. A gauging apparatus for performing measurements with respect to a vehicle comprising:

first and second elongated measuring arms of bar-like shape; and means for mounting said first and second arms so as to lie one over the other and to move synchronously one over the other along parallel linear paths toward and away from one another, said means including respective first and second gear tracks in said first and second arms, gear means for riding between said first and second gear tracks, and means for slidably mounting said arms with respect to one another while maintaining said gear means meshed between said first and second gear tracks; and single measurement means for simultaneously measuring a first distance along said first arm from a distal end of the first elongated measuring arm to a point in the mounting means and a second distance along said second arm from a distal end of the second elongated measuring arm to the same point in the mounting means, thereby producing a measurement of distance between the two distal ends.

20. The gauging apparatus of claim 19 wherein said mounting means comprises:

shaft means for mounting said gear means; and housing means surrounding said arms for mounting said shaft means and slidably receiving said first and second arms.

21. A gauging apparatus for performing measurements with respect to a vehicle comprising:

first and second elongated measuring arms of bar-like shape;

means for mounting said first and second arms so as to lie one over the other and to move one synchronously with the other along parallel linear paths toward and away from one another, said means including respective first and second gear tracks in said first and second arms, gear means for riding between said first and second gear tracks, and means for slidably mounting said arms with respect to one another while maintaining said gear means meshed between said first and second gear tracks;

single measurement means for simultaneously measuring a first distance along said first arm from a distal end of the first elongated measuring arm to a point in the mounting means and a second distance along said second arm from a distal end of the second elongated measuring arm to the same point in the mounting means, thereby producing a measurement of distance between the two distal ends;

first and second suspension blocks pivotally mounted to said distal ends of said apparatus, one on said first arm, and one on said second arm, each said block having a respective bore therethrough; and pinch well clamp means insertable into one of said respective bores for attachment to the pinch well of said vehicle.

22. The gauging apparatus of claim 21 further including threaded stud pin holder means insertable into one of said respective bores for attachment to a preexisting threaded hole of said vehicle.

* * * * *